Figure 1:
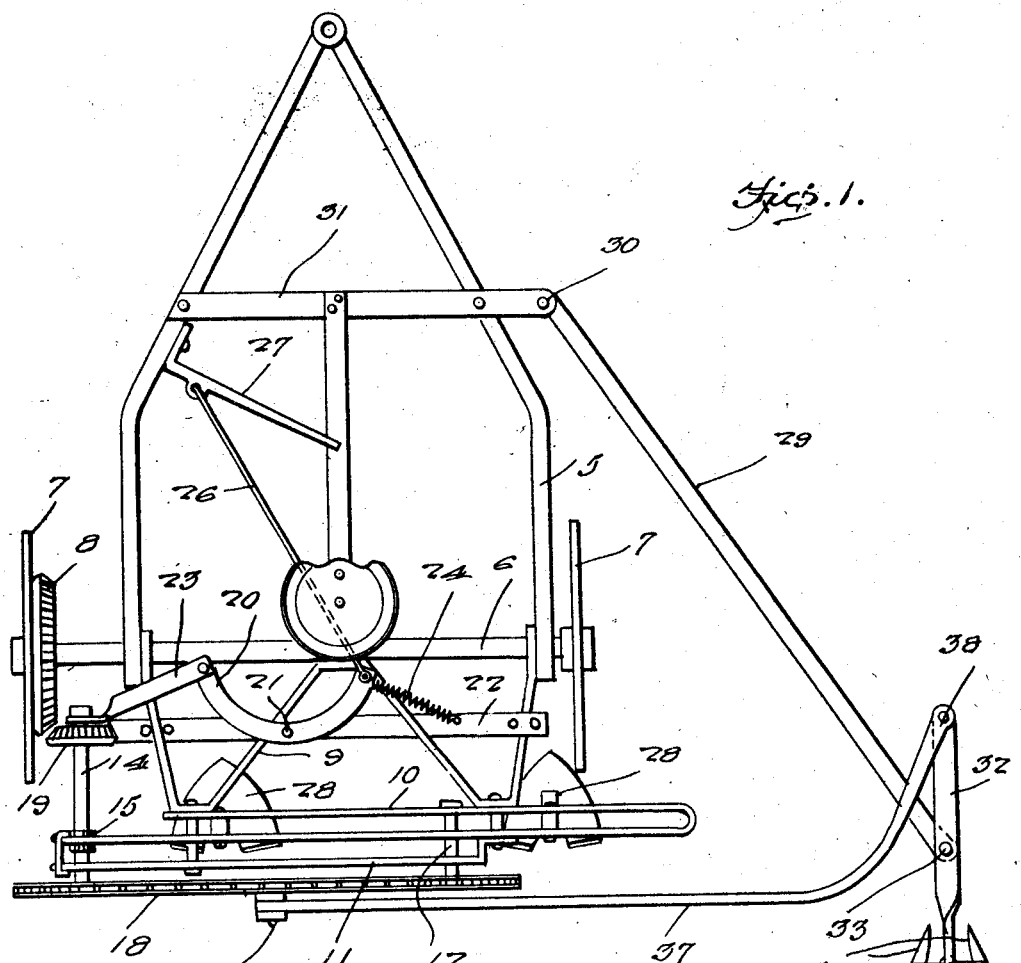

July 19, 1927.

P. E. DION

ATTACHMENT FOR SHOVEL CULTIVATORS

Filed Aug. 30, 1926

1,636,219

2 Sheets-Sheet 1

Inventor
Pierre E. Dion

By Clarence A. O'Brien
Attorney

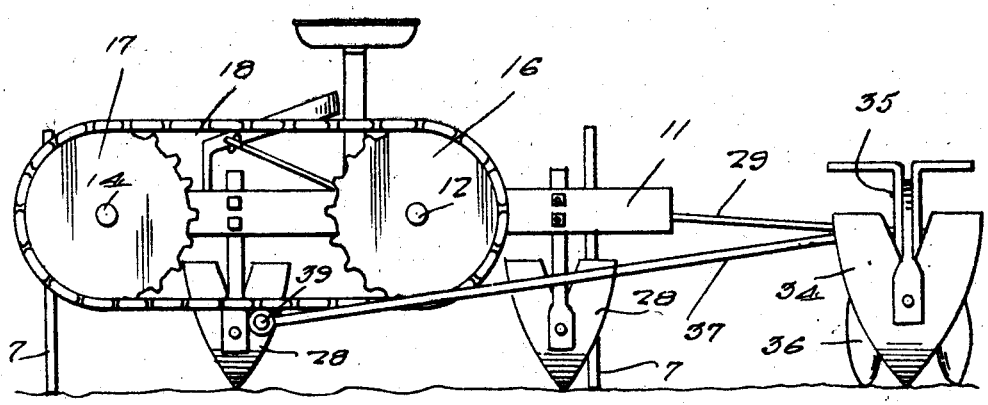
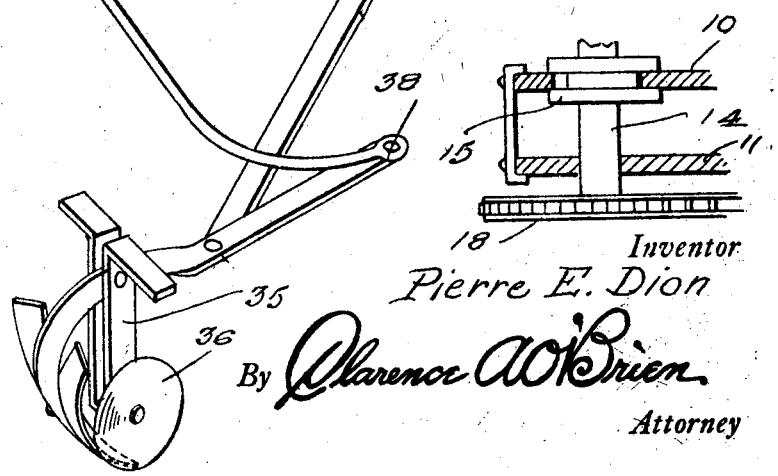

Patented July 19, 1927.

1,636,219

UNITED STATES PATENT OFFICE.

PIERRE E. DION, OF GARDENA, CALIFORNIA.

ATTACHMENT FOR SHOVEL CULTIVATORS.

Application filed August 30, 1926. Serial No. 132,604.

The present invention relates to shovel cultivators, and more particularly to an attachment therefor and has for its principal object to provide a shovel harrow attachment which may be used in cultivating orchards, particularly in between the trees.

Another important object of the invention is to provide a shovel harrow attachment which is operated by the shovel harrow which will follow a sinuous path for zig-zagging in and out among a row of trees in an orchard for cultivating purposes.

Another important object of the invention lies in the provision of a structure of this nature which is exceedingly simple in its construction, easy to assemble and disassemble, inexpensive to manufacture, strong and durable, efficient and reliable in operation, not like to readily get out of order, and otherwise well adapted to the purpose for which it is designed.

With the above and numerous other objects in view which will appear as the description proceeds, the invention resides in certain novel features of construction, and in the combination and arrangement of parts as will be hereinafter more fully described and claimed.

In the drawing:—

Figure 4:
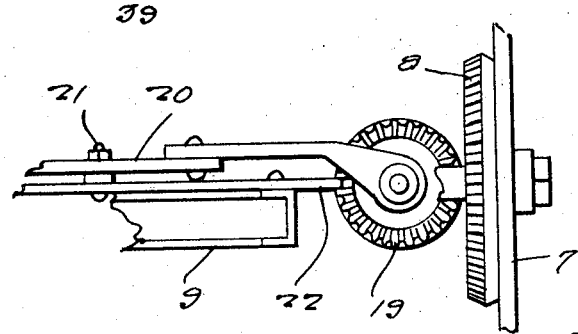

Figure 1 is a top plan view of a shovel cultivator with my improved attachment associated therewith, Fig. 2 is a rear elevation thereof, Fig. 3 is a detail perspective of the attachment, Fig. 4 is a detail fragmentary view showing the drive for the attachment, and Fig. 5 is another detail view of the drive.

Referring to the drawing in detail, it will be seen that the numeral 5 denotes generally the chassis or body of the cultivator which is mounted on an axle 6 on which is journaled wheels 7. On one of the wheels 7, there is fixed in any suitable manner, a beveled gear 8. A zig-zag bar 9 is attached to the body of the cultivator 5 at the rear thereof, and supports a U-shaped bar 10 which extends transversely and has its rear arm longer than its front arm.

A bar 11 is attached to the longer arm of the U-shaped bar 10 so that the major portion thereof is spaced from said longer arm. A shaft 12 is mounted in the bars 11 and 10, extending through both arms of said bar 10, adjacent the right hand side thereof. A shaft 14 is journaled in a bearing 15 slidably mounted in the extremity of the longer arm of the bar 10 and is extended through the bar 11 so as to be capable of a rocking motion.

Sprockets 16 and 17 are mounted respectively on shafts 12 and 14 at their rear ends and have a chain 18 trained thereover. A bevel gear 19 is mounted on the forward end of the shaft 14 and is meshable with the bevel gear 8. A lever 20 is fulcrumed at 21 on a cross bar 22 mounted on the zig-zag bar 9 and is connected at one end to a link 23 which is engaged with the shaft 14. A spring 24 is engaged with the other end of the lever 20 and normally urges said lever to pull the link 23 so as to hold the bevel gear 19 normally out of mesh with the bevel gear 8.

A link 26 is engaged with the same end of the lever 20 as the spring 24, and is also engaged with a foot pedal 27 so that by rocking the foot pedal 27, the link 26 may be pulled for rocking the lever 20, thereby pushing on the link 23 so as to rock the shaft 14 to place the gear 19 into mesh with the gear 8, thereby driving the chain 18 thru its orbit about the sprockets 16 and 17.

Conventional or any form of shovel cultivators 28 depend from the U-shaped bar 10. A beam 29 is pivotally engaged as at 30 with the left hand end of a cross member 31 of the body 5. A cultivator beam 32 is pivoted intermediate its ends as at 33 on the other extremity of the beam 29, and has its rear end curved for supporting a shovel cultivator implement 34. Standards 35 are attached to the curved portion of the beam 32 and has journaled on their lower extremities, disks 36. A link 37 is pivoted as at 38 to the forward end of the beam 32 and is pivotally engaged as at 39 to a portion of the chain 18.

It will therefore be seen that as the chain 18 moves through its orbit about the sprockets 16 and 17, the cultivator implement 34 will be guided in a zigzag or sinuous path so as to move in and out among a row of orchard trees for cultivating purposes. The movement imparted to the link 37 by the chain will not only pivot the beam 32 at 33 but will also cause the pivoting of beam 29 or 30.

It will be seen that the attachment may be brought into operation simply by the driver pressing his foot against the pedal 27, the attachment being held normally inactive, that is, so as to move in a straight path by the spring 24 holding the gear 19 of the drive gear 8 on one of the wheels 7.

It is thought that the construction, operation, and advantages of this invention will now be clearly understood by those skilled in this part without a more detailed description thereof. The present embodiment of the invention has been disclosed in detail merely by way of example since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. An attachment of the class described, including a beam, a cultivator implement on one end of the beam, a second beam having one end thereof pivotally engaged with an intermediate portion of the first beam, a link pivotally engaged with the forward end of the first beam, a pair of sprockets adapted to be mounted on a cultivator, a chain trained over said sprockets, and means for engaging a portion of the chain with the other end of the link, and means for imparting rotary motion to one of the sprockets on the movement of the cultivator.

2. A cultivator of the class described including a frame, wheels for the frame, a pair of sprockets journaled on the frame, a chain trained over said sprockets, a beam having one end pivotally engaged with the frame, a second beam having an intermediate portion pivotally engaged with the other end of the first beam, a cultivating implement on the rear end of the second beam, a link engaged with the forward end of the second beam and engaged with a portion of the chain, and means for driving one of the sprockets from one of the wheels.

3. A cultivator of the class described including a frame, wheels for the frame, a pair of sprockets journaled on the frame, a chain trained over said sprockets, a beam having one end pivotally engaged with the frame, a second beam having an intermediate portion pivotally engaged with the other end of the first beam, a cultivating implement on the rear end of the second beam, a link engaged with the forward end of the second beam and engaged with a portion of the chain, and means for driving one of the sprockets from one of the wheels, said means including a shaft extending from one of the sprockets, a beveled gear on said shaft, a beveled gear on one of the wheels, a link engaged with said shaft, a lever pivoted on the frame, a spring normally holding said lever so that said link holds said first beveled gear out of mesh with the second beveled gear, and means for rocking the lever for swinging the second beveled gear into mesh with the first beveled gear.

In testimony whereof I affix my signature.

PIERRE E. DION.